Patented Oct. 16, 1951

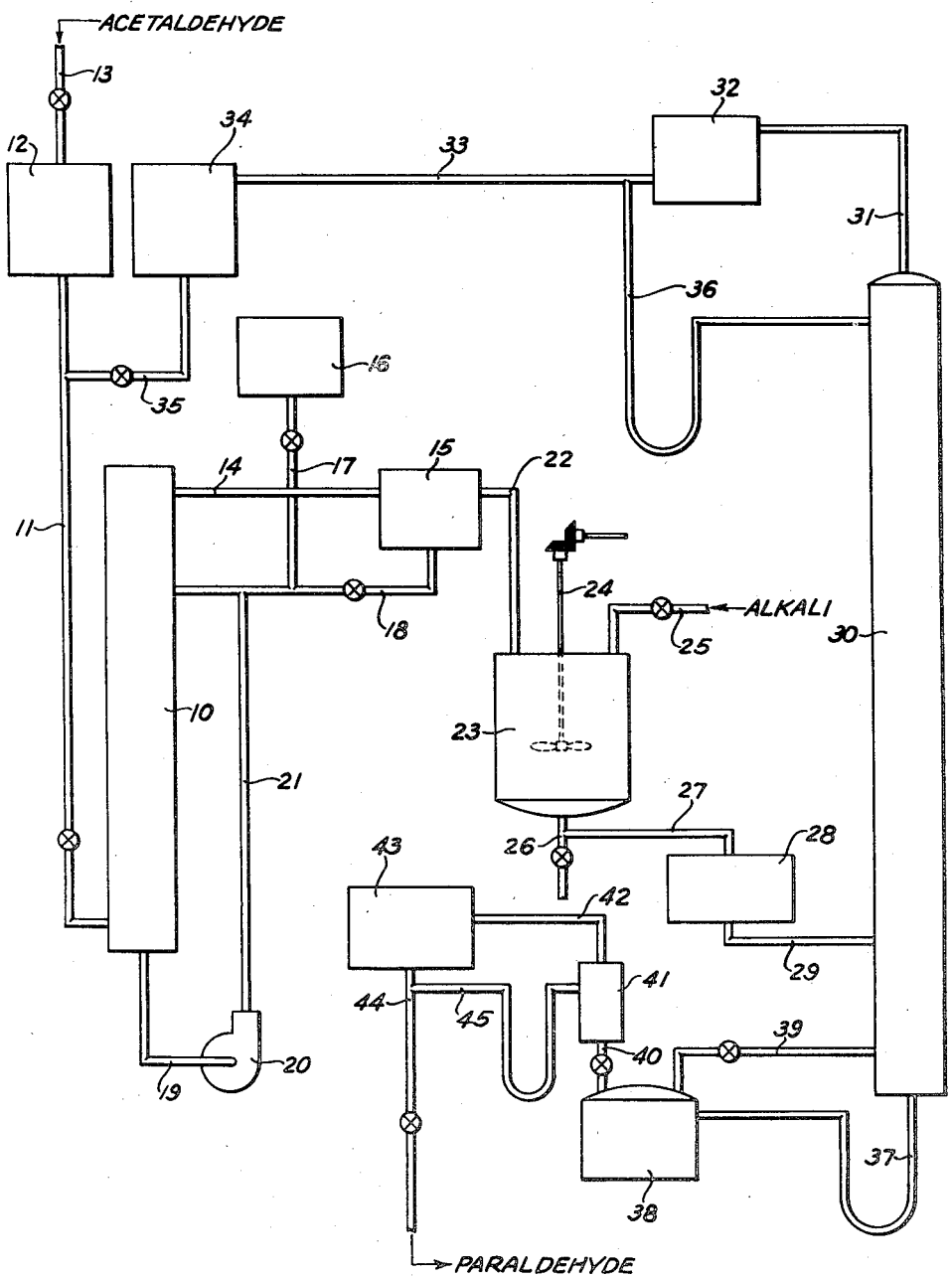

2,571,759

UNITED STATES PATENT OFFICE 2,571,759

CONTINUOUS PROCESS FOR POLYMERIZING ALIPHATIC ALDEHYDES

Martin F. Quinn and Bernard K. Bright, Kingsport, Tenn., assignors to Eastman Kodak Company, Rochester, N. Y., a corporation of New Jersey Application October 13, 1948, Serial No. 54,274

2 Claims. (Cl. 260—340)

This invention relates to an improved process for the polymerization of aliphatic aldehydes. More particularly this invention relates to a process for continuously polymerizing aliphatic aldehydes.

It is known that aliphatic aldehydes can be made to polymerize, or undergo "self addition," in the presence of certain condensation agents. Many of the methods heretofore employed comprised carrying out the polymerization in batch lots, a procedure which produced an inferior product in a low yield. A continuous method for the polymerization of aliphatic aldehydes which comprises passing concurrently the aldehyde and the condensing agent downwardly through a vertically disposed column is shown in Thompson U. S. Patent No. 2,318,341, dated May 4, 1943.

The process of this invention provides improvements in the polymerization of aliphatic aldehydes in the presence of condensing agents, over both the batch and the continuous methods heretofore used, in that products of higher purity and of increased yields can be obtained.

It is, therefore, an object of this invention to provide an improved method for polymerizing aliphatic aldehydes in the presence of a condensing agent. Another object is to provide a continuous method for polymerizing aliphatic aldehydes in the presence of a condensing agent. Still another object is to provide an improved, continuous process for preparing paraldehyde. Still another object is to provide a continuous method for polymerizing aliphatic aldehydes in the presence of a condensing agent wherein the concentration of the condensing agent can be accurately and conveniently controlled. A still further object is to provide a process for polymerizing aliphatic aldehydes in the presence of a condensing agent to give increased yields of a purer product. Another object is to provide an apparatus wherein the process of the invention can be carried out. Other objects will become apparent from a consideration of the following description.

According to this invention we accomplish the above objects by passing an aliphatic aldehyde in a continuous manner countercurrently to the flow of the condensing agent. Operating in this fashion, we have found that most advantageous results can be obtained by introducing the condensing agent, preferably in the form of an aqueous solution, near the top portion of a vertically disposed column, while the aliphatic aldehyde is introduced near the bottom. The aliphatic aldehyde flowing upwardly in the column countercurrently to the downward flow of the condensing agent, is polymerized and then withdrawn from the top portion of the column. The polymerized aliphatic aldehyde is then passed to a decanter, where water is separated, and the water returned to the reaction column. The water generally contains varying amounts of the polymerized aliphatic aldehyde which have dissolved in the water. The major portion of the polymerized aliphatic aldehyde after passing from the decanter can then be recovered in any known manner.

As aliphatic aldehydes we can use acetaldehyde, propionaldehyde, n-butyraldehyde, isobutyraldehyde, etc., (e. g. an aliphatic aldehyde containing from 2 to 4 carbon atoms).

As condensing agents, the mineral acids, e. g. sulfuric acid, etc., have been found to provide especially useful results. Mineral acids other than sulfuric acid, e. g., orthophosphoric acid, hydrochloric acid (in gaseous form or in the form of an aqueous solution), etc., or acid salts, such as sodium bisulfate, etc., can be used in our process, though usually to less advantage. Aqueous solutions containing from 20 to 60% by volume of acid can be used to advantage in our process. Aqueous solutions containing from 40 to 50% by volume of the acid have been found to be especially useful.

The temperatures which can advantageously be employed in carrying out our process vary and are generally a function of the particular aldehyde being polymerized. In the polymerization of acetaldehyde to produce paraldehyde, temperatures varying from 20 to 60° C. can conveniently be employed. In the polymerization of acetalydehyde temperatures below 15° C. increase the tendency of the acetaldehyde to form metaldehyde, often an undesirable product in the formation of paraldehyde. Temperatures above 60° C. should generally be avoided in the polymerization of acetaldehyde, since charring of the sought-for product is likely to occur. When aldehydes having a boiling point greater than that of acetaldehyde at normal pressures are employed, higher temperatures (e. g. 80° to 90° C.) can, of course, be used to advantage.

Pressures greater than atmospheric pressure can be used in the process of this invention, although there is ordinarily no advantage in using such pressures. The aldehyde being polymerized can thus be introduced into the reaction vessel in the form of a vapor, or in liquid form.

As will be apparent from the following description, the conditions of operation in the process of this invention can vary rather widely. For example, the rate of the production of the polymerized aliphatic aldehyde can be increased by increasing the rate of feed of the aldehyde and condensing agent. If such a step results in an elevation of the temperature of the reaction vessel, this can be compensated for by cooling the vessel by artificial means, e. g., circulating a cooled brine or glycol through a jacket surrounding the reaction chamber, or by recycling a portion of the reaction liquid through the reaction vessel.

The accompanying drawing illustrates, schematically, apparatus suitable for carrying out our invention in one of its embodiments. The drawing shows a vertically disposed reaction vessel 10, equipped with a feed line 11 supplied with a shut-off valve. The feed line 11 leads to a reservoir 12 which has attached thereto an inlet 13 supplied with a cut-off valve. An overflow line 14 extends from the top of the reaction vessel to a decanter 15. The decanter has a return line 18 supplied with a shut-off valve which is connected to the top portion of the reaction vessel. Extending from the return line 18 is a feed line 17 (supplied with a shut-off valve) which is connected with a reservoir 16. A discharge line 19 extends from the bottom of the reaction vessel and is connected via pump 20 to a conduit 21, which is connected to the overflow line 18 at a point near its entry to the reaction vessel. A line 22 connects the decanter with a neutralizer 23 which is equipped with a stirrer 24 which can be driven by a motor (not shown). A feed line 25 supplied with a shut-off valve extends from the top of the neutralizer. Extending from the bottom of the neutralizer is a discharge line 26 supplied with a shut-off valve. A conduit 27 connects the discharge line 26 to the top of a feed tank 28. A discharge line 29 connects the feed tank with a refining still 30. A vapor line 31 extends from the top of the refining still to a condenser 32. Extending from the condenser is a line 33 which is connected to a return feed tank 34. A feed line 35 supplied with a shut-off valve extends from the bottom of the return feed tank and is connected to the feed line 12. A reflux line 36 equipped with a liquid seal connects the line extending from the condenser (line 33) with the top of the refining still. A discharge line 37 equipped with a liquid seal extends from the bottom of the refining still to a boiler 38. An overhead return line 39 supplied with a shut-off valve connects the top of the boiler with the bottom of the refining still. Extending from the top of the boiler is an overhead line 40 supplied with a shut-off valve which is connected to a refractionating column 41. A vapor line 42 connects the top of the refractionating column with a condenser 43. A discharge line 44 supplied with a shut-off valve extends from the bottom of the condenser. A return line 45 equipped with a liquid seal connects the discharge line 44 to the refractionating column.

*Example*

In accordance with one embodiment of our invention, freshly distilled acetaldehyde was fed into the reservoir 12 via the inlet 13. The acetaldehyde flowed from the reservoir into the reaction vessel 10 through the feed line 11. An aqueous solution of sulfuric acid containing 50% by volume of sulfuric acid was fed from the reservoir 16 through feed line 17 into the return line 18. The aqueous sulfuric acid solution flowed through the return line 18 into the top of the reaction vessel 10, wherein it was contacted with the acetaldehyde which flowed countercurrently to the downward flow of the aqueous sulfuric acid solution. During its upward passage a substantial portion of the acetaldehyde was converted to paraldehyde. The base of the reaction vessel was equipped with a Calandria coil which was supplied with sufficient steam to maintain a base temperature of from 46° to 50° C. The rate of feed of the acetaldehyde and sulfuric acid solution was such that, with the aid of a cooling medium which jacketed the reaction vessel, the temperature of the contents of the top portion of the reaction vessel was maintained at from 20° to 25° C. The cooling medium also served as a convenient means for avoiding local overheating due to the exothermic nature of the reaction. The reaction liquor containing paraldehyde, some acetaldehyde, water and some acid was allowed to overflow via the overflow line 14 into the decanter 15. The water which settled to the bottom of the decanter was withdrawn and returned via the return line 18 to the reaction vessel, thus providing a convenient means for preventing the aqueous sulfuric acid solution from becoming too concentrated. The water returning to the top of the reaction vessel via the return line 18 was mixed with sulfuric acid which was circulated from the bottom of the reaction vessel via the discharge line 19 into the pump 20 where it was driven through the conduit 21 and thence to the return line 16 for mixing with the water returning from the decanter. The upper layer of liquid in the decanter was fed via the line 22 into the neutralizer 23 where it was agitated with the stirrer 24, and any acid present was neutralized with a saturated solution of sodium carbonate which was admitted to the neutralizer via the inlet line 25. After removal of undissolved sodium sulfate via the discharge line 26, the contents of the neutralizer were fed via the discharge line 26 into the conduit 27, from which they passed into the top of the feed tank 28. The neutralized liquor was withdrawn from the bottom of the feed tank via the discharge line 29 and fed into the refining still 30 at a point about midway in the still. The neutralized liquor was distilled in the refining still 30, and the heads product which consisted largely of water and acetaldehyde and a small amount of paraldehyde was withdrawn from the top of the refining still via the vapor line 31 and condensed in the condenser 32. The condensate was withdrawn from the condenser via the line 33, and allowed to flow to the return feed tank 34 from the bottom of which it was withdrawn via the feed line 35, fed into the feed line 11, and then returned to the reaction vessel. A reflux was maintained in the refining still by returning a portion of the heads product from the line 33 to the refining still via the return line 36. The crude paraldehyde in the bottom of the defining still was fed into the boiler 38 via the discharge line 37. Low boiling products (mainly acetaldehyde) were returned from the boiler to the bottom of the refining still via the overhead return line 39. The crude paraldehyde was fed from the top of the boiler to the bottom of a refractionating column via an overhead line 40. The paraldehyde vapors passed from the top of the refractionating column to a condenser 43 via the vapor line 42. Pure paraldehyde was withdrawn from the bottom of the condenser through the discharge line 44. A reflux was maintained in the refractionating column 41 by returning a portion of the condensate from the line 44 to the refractionating column via return line 45.

Samples of the pure paraldehyde withdrawn from the discharge line 44 and crude paraldehyde taken from the discharge line 37 throughout a typical run were analyzed. The results given below indicate the approximate composition of these samples:

Crude paraldehyde:

| | Per cent |
|---|---|
| Acetic acid | 0.30 to 0.60 |
| Acetaldehyde | 3.0 to 5.5 |
| Water | 0.5 to 0.78 |
| Paraldehyde [1] | 93.12 to 96.2 |

[1] Determined by difference.

Refined paraldehyde:

| | |
|---|---|
| Freezing point, °C | 10.7 |
| Specific gravity at 15.6° C | .99404 |
| Acetic acid per cent | 0.1 to 0.3 |
| Acetaldehyde do | 0.1 to 0.2 |
| Sulfates | None |
| Chlorides | None |

The reaction liquor forming the upper layer of the decanter 15 can be purified in any desired manner, the above detailed description merely illustrating a procedure which has been found to provide the most advantages in our improved process. It is to be understood that other methods of purifying the upper layer of liquid in the decanter can likewise be used according to the broader aspects of our invention. Other aliphatic aldehydes (e. g. those containing from 2 to 4 carbon atoms) can be used to advantage in practicing the process of our invention.

Although the process of our invention has been described above with particular reference to the polymerization of acetaldehyde, to paraldehyde, or a like polymerization of other aliphatic aldehydes, our process is also readily adaptable to the polymerization of acetaldeyde to aldol or a like polymerization of other aliphatic aldehydes. The sulfuric acid used above would in such a process be replaced by a 5 to 10%, by weight, aqueous solution of a basic condensing agent, e. g., an alkali metal or alkaline earth hydroxide (sodium potassium, barium, etc. hydroxides), sodium carbonate, potassium carbonate, sodium acetate, sodium ethylate, etc. Temperatures of from 0° to 40° C. could be used. The aldol in the neutralizer 25 is advantageously treated with a weak acid solution, e. g. an aqueous acetic acid solution, to neutralize any alkali present in the crude aldol. The alkaline catalyst concentration in the reaction vessel 10 is advantageously maintained at a substantially constant concentration by returning water from the decanter 15 to the reaction vessel.

It can thus be seen that the objects set forth above have been accomplished and the art is provided a new, improved and highly efficient method of polymerizing aliphatic aldehydes. Our invention is particularly distinguished in that the hereindescribed processes can be conducted in a continuous manner to give improved yields with a minimum of undesirable products. Our process is further distinguished in that it provides a convenient method for maintaining a substantially constant concentration of catalyst in the reaction vessel at all times. Many other advantages of our invention will be readily apparent to those skilled in the art.

What we claim as our invention and desire secured by Letters Patent of the United States is:

1. A substantially continuous process for polymerizing acetaldehyde to paraldehyde comprising introducing acetaldehyde near the bottom of a vertically disposed column while an aqueous solution of a mineral acid containing from 20 to 60% by volume of the mineral acid is introduced near the top portion of said column, passing the acetaldehyde upwardly through the said column countercurrently to the downward flow of the aqueous solution of the mineral acid, regulating the rate of feed of the acetaldehyde and the aqueous solution of the mineral acid and cooling the said reaction vessel to maintain the temperature of the contents of the said column at from 20° to 60° C. during the polymerization, withdrawing a portion of the reaction mixture containing paraldehyde from the top of said vertically disposed column, separating water by gravity from the withdrawn reaction mixture containing paraldehyde, and maintaining the acid concentration substantially constant throughout the reaction by returning the separated water to the top portion of the said vertically disposed column.

2. A process according to claim 1 wherein sulfuric acid is used as the mineral acid.

MARTIN F. QUINN.
BERNARD K. BRIGHT.

REFERENCES CITED

The following references are of record in the file of this patent:

UNITED STATES PATENTS

| Number | Name | Date |
|---|---|---|
| 2,318,341 | Thompson | May 4, 1943 |
| 2,378,439 | Schlesman | June 19, 1945 |
| 2,409,090 | Woodward | Oct. 8, 1946 |
| 2,433,524 | Metzger | Dec. 30, 1947 |
| 2,442,942 | Tuerck et al. | June 8, 1948 |